No. 700,837. Patented May 27, 1902.
F. A. SEIBERLING.
SOLID RUBBER VEHICLE TIRE.
(Application filed Jan. 15, 1902.)
(No Model.)

Witnesses:
W. H. Bowman
Maude Gwisler

Inventor:
Frank A. Seiberling,
by Humphrey & Humphrey,
Attorneys.

UNITED STATES PATENT OFFICE.

FRANK A. SEIBERLING, OF AKRON, OHIO.

SOLID-RUBBER VEHICLE-TIRE.

SPECIFICATION forming part of Letters Patent No. 700,837, dated May 27, 1902.

Application filed January 15, 1902. Serial No. 89,844. (No model.)

*To all whom it may concern:*

Be it known that I, FRANK A. SEIBERLING, a citizen of the United States, residing at Akron, in the county of Summit and State of Ohio, have invented a certain new and useful Improvement in Solid-Rubber Vehicle-Tires, of which the following is a specification.

My invention has relation to improvements in that class of solid-rubber vehicle-tires which are adapted to rest in metallic tires which have lateral inturned flanges and which rubber tires have lateral flanges on each side of the base adapted to rest under the inturned metallic flanges and to be thus retained against displacement from a sudden side strain or otherwise. To prevent this displacement, resort has been had to stiffening the rubber by incorporating ingredients to render it hard and firm when vulcanized; but this process is found objectionable, as it impairs the elasticity of the rubber and destroys the cushion character that is so desirable.

The object of my invention is to overcome these defects and produce a tire that shall be thoroughly elastic, but that will resist displacement from lateral strain.

To the accomplishment of the aforesaid object my invention consists in the peculiar and novel construction, arrangement, and combination of parts hereinafter described and then specifically pointed out in the claims, reference being had to the accompanying drawings, which form a part of this specification.

Figure 1:
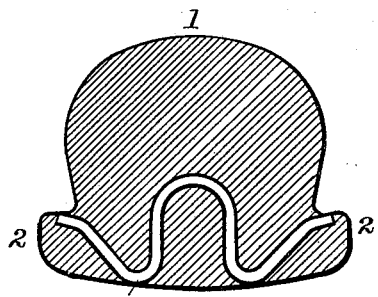
Figure 2:
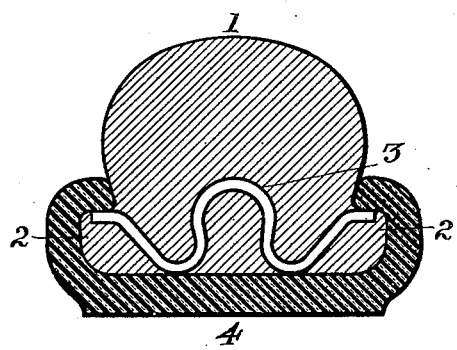

In the accompanying drawings, in which similar reference-numerals indicate like parts in the different figures, Figure 1 is a section of my improved tire at the line of one of the interposed wires, and Fig. 2 a similar section of the rubber and metal tire combined.

Referring to the figures, 1 is the rubber tire, with a round tread portion and lateral flanges 2 2 at each side of the base to lie under the incurved flanges of the metal tire. The bottom or inner periphery of this tire is normally curved downward for a purpose to be stated.

Embedded in the tire 1 at intervals are transverse wires 3, bent in the peculiar manner shown, the center being slightly below the center of the tire 1, curved downward in each direction and extending on each side substantially to the bottom line of the tire 1, and thence curved outward, extending diagonally upward nearly to the inner angle of the tire 1 and flange 2, and thence bent nearly horizontal and terminating near the outer upper corners of the flanges 2. This wire should be large enough to afford desired strength to resist displacement, as hereinbefore described, but be sufficiently yielding to permit the compression of the tire by ordinary tools to place it in the metal tire, and instead of wire small bars of metal may be used, as their cross-section is not of importance.

When the tire 1 is placed in the metal tire 4, the result of the expansion of the base is to simultaneously bear the flanges 2 down and the curved base upward, so that the latter is straight and lies flat upon the outer flat periphery of the metal tire.

By this construction and arrangement the base and flanges of the rubber tire 1 are in constant tension and are firmly held against displacement.

Having thus described my invention, what I claim, and desire to secure by Letters Patent, is—

1. An improved solid-rubber vehicle-tire having a rounded tread portion, with lateral flanges on each side of the base, and a downwardly-curved base, and having embedded transverse wires or rods curved downward, in the center from near the center of the rubber tire on each side to the base, thence diagonally upward to the upper inner angles of the flanges and tire, substantially as shown and described.

2. An improved solid-rubber vehicle-tire having a tread portion, a base, and lateral flanges on each side of the base, having at intervals embedded transverse wires or rods curved downward in the center from near the center of the rubber on each side to the base, thence diagonally upward to the upper parts of the flanges, substantially as shown and for the purpose specified.

3. The combination with a metallic tire having lateral, inturned flanges forming channels, of a rubber tire adapted to rest in said metal tire having lateral flanges to fit said channels, and having at intervals, embedded wires or rods in planes transverse to said rubber tire centrally curved downward from near the center of the rubber on each side to the base, and thence diagonally upward into the flanges near their upper faces, substantially as shown and described.

In testimony that I claim the above I hereunto set my hand in the presence of two subscribing witnesses.

FRANK A. SEIBERLING.

In presence of—
C. P. HUMPHREY,
C. E. HUMPHREY.